(12) United States Patent
Martens et al.

(10) Patent No.: US 7,504,074 B2
(45) Date of Patent: Mar. 17, 2009

(54) CHLORINE DIOXIDE GENERATION SYSTEMS

(75) Inventors: Edward M. Martens, Loveland, CO (US); Earl B. Smith, Birmingham, AL (US); Gregory J. Beckstrom, Sunshine, LA (US)

(73) Assignee: Siemens Water Technologies Corp., Lowell, MA (US)

( * ) Notice: Subject to any disclaimer, the term of this patent is extended or adjusted under 35 U.S.C. 154(b) by 261 days.

(21) Appl. No.: 10/457,335

(22) Filed: Jun. 9, 2003

(65) Prior Publication Data

US 2003/0229422 A1    Dec. 11, 2003

Related U.S. Application Data

(60) Provisional application No. 60/388,070, filed on Jun. 11, 2002.

(51) Int. Cl.
   *B01J 19/00*   (2006.01)
   *C01B 11/02*   (2006.01)

(52) U.S. Cl. .............. 422/108; 422/105; 422/110; 422/111; 422/129; 423/477; 700/266

(58) Field of Classification Search ........... 422/110, 422/111
See application file for complete search history.

(56) References Cited

U.S. PATENT DOCUMENTS 3,816,077 A * 6/1974 Fuller et al. ............... 422/189
4,013,761 A   3/1977 Ward et al. ................ 423/477
4,234,446 A   11/1980 Ramras ................. 252/187 R
4,247,531 A   1/1981 Hicks ....................... 423/477
4,251,224 A   2/1981 Cowley et al. ............. 423/477
4,251,503 A   2/1981 Swindells et al. .......... 423/478
4,311,485 A * 1/1982 Saltzman et al. ........... 436/101
4,534,952 A * 8/1985 Rapson et al. ............. 423/478
4,590,057 A   5/1986 Hicks ....................... 423/477
4,803,039 A * 2/1989 Impink et al. ............. 376/216
5,009,875 A   4/1991 Kelley et al. .............. 423/477
5,204,081 A   4/1993 Mason et al. ............. 423/478
5,227,306 A * 7/1993 Eltomi et al. ............... 436/55
5,780,737 A * 7/1998 Wible et al. ............ 73/204.22
6,468,479 B1 * 10/2002 Mason et al. .............. 422/187

FOREIGN PATENT DOCUMENTS

JP    2000185908 A * 7/2000

* cited by examiner

Primary Examiner—Jennifer A Leung

(57) ABSTRACT

A chloride dioxide generation system made efficient by the use of a minimum number of seals and the use of a sophisticated computerized control system with the chlorine dioxide generation system comprising a) multiple PID loop control, b) a touch screen interface (HMI), c) automatic flow control of chemical precursors, d) a process controller, e) a minimum number of seals, f) a seal-less vacuum eductor, g) a unit design of the ejector; seal-less tubing connector and seal-less manual flowmeters, h) a vacuum eductor to be used with gas supply and other chemical feeds, i) a mass dispersion chlorine flowmeter to accurately supply amount of chlorine gas, j) an optical chlorine dioxide analyzer looped to the process controller and k) an automatic efficiency control screen.

25 Claims, 10 Drawing Sheets

CHLORINE DIOXIDE GENERATION SYSTEMS

RELATED APPLICATION

This application is related to provisional application 60/388,070 filed Jun. 11, 2002.

FIELD OF THE INVENTION

The invention finds applicability in the field of chlorine dioxide generation.

BACKGROUND OF THE INVENTION

There is a need in the field of chlorine dioxide generation to produce a chlorine dioxide generation system which is efficient to use and in which the potential for break-downs and down-time is substantially reduced.

The following U.S. Pat. Nos. are of interest:

| Inventor(s) | U.S. Pat. No. |
| --- | --- |
| Ward et al | 4,013,761 |
| Ramras | 4,234,446 |
| Hicks | 4,247,531 |
| Cowley | 4,251,224 |
| Swindells et al | 4,251,503 |
| Hicks | 4,590,057 |
| Kelley et at | 5,009,875 |
| Maso et at | 5,204,081 |

Hicks (U.S. Pat. No. 4,247,531), Hicks (U.S. Pat. No. 4,590,057) and Mason et al (U.S. Pat. No. 5,204,081) teach chlorine generating devices wherein the components are joined by threaded members. The herein disclosed invention has an improved electronic control system and novel design features over these patents.

Swindells et al (U.S. Pat. No. 4,251,503) and Cowley et al (U.S. Pat. No. 4,251,224) teach systems for generating chlorine dioxide wherein the process can be completely automated. The chemistry of these two patents is distinct from the inventive process disclosed herein.

Kelly et al (U.S. Pat. No. 5,009,875) teach a chlorine dioxide generating system wherein the various operating conditions are monitored. Kelly et al employ pH control and excess chlorine rather than stoichiometric control used herein.

Ward et al (U.S. Pat. No. 4,013,761) and Ramras (U.S. Pat. No. 4,234,446) are cited as being of general interest only.

SUMMARY OF THE INVENTION

The chlorine dioxide generation system of this invention is designed to produce chlorine dioxide in a most efficient, economical and safe manner.

The new chlorine dioxide generation systems of this invention incorporate a number of new design features and innovations which enhance the performance of the equipment as well utilize "state-of-the-art" components. The new chlorine dioxide generating system is provided with enablements for the automatic control of the flow of the chemical precursors using electronic flow meters, electronic flow control valves, and a process controller that utilizes the flow meter information to position the control valves. A further component allows for the input of various electronic signals from the plant to add another level of control.

DEFINITIONS OF TERMS AND CONCEPTS USED IN THIS DISCLOSURE ARE

"Gas in air" is escaping gas (e.g., chlorine dioxide) in the air which should not be there. Gas in the air will cause a shut-down of the generator.

"Eductor motive water flow" is a pressure and flow measurement. With a drop of pressure or flow, the vacuum will be broken causing the generator to shut-down.

"Set point deviation" is deviation from the required amount of chlorine dioxide (e.g., the amount of chlorine dioxide per a 24-hour period).

"Generator set point" is the set point for the amount of chloride that the generator is scheduled to produce.

"Process Variable" or "Production Value" is the actual amount of chlorine dioxide produced relative to the theoretical amount. This can be determined by the sodium chlorite flow-rate.

"Efficiency" is measured by a stoichiometric amount. For example, the conversion of sodium chlorite to chlorine dioxide. This can also be a measure of yield or purity.

"Real time data" is data produced by the controller on a constant (at all times) basis.

The amount of chlorine gas used in the system is measured in terms of pounds per unit time (e.g., pounds/day).

The Chlorine Dioxide Generation System of this invention will report "Real-time generation efficiency". That is, the system will continuously give a "read-out" of the operating efficiency of the system (e.g., how efficiently the system is producing chlorine dioxide).

The controller has been programmed to receive "generator effluent analysis", "eductor water flow rate", "precursor chemical flow rate" and "process variable verification".

Programmed into the system is an inventory of precursor chemicals previously used (e.g., on a monthly basis) to be compared with the current month's usage. If there is a major discrepancy, the system will signal this.

Previous controllers are outdated, expensive, and very tedious to program and/or change operating conditions. A new control scheme has been devised to accommodate better interaction between equipment operators and the controller. The "process controller" of this invention is a combination of a Programmable Logic Controller (PLC) and an interactive Touch Screen Interface. Both devices are programmed to perform desired functions. The PLC incorporates a Ladder Logic Program that is used to control various components (flow meters, valves, switches), analyze data (generated or set internally, or input from an external source), monitor alarms status, and provide appropriate outputs. The Touch Screen program routes data to and from the PLC, displays outputs from the PLC, and allows control information to be sent to the PLC.

An interactive "Human-Machine-Interface" or HMI has been incorporated that provides the operator with complete details of unit operation. This interface allows the operator to look at data, monitor conditions and make selections and changes by "touching the screen". The operator does not need an intimate knowledge of the equipment to achieve a desired result. The new design utilizes multiple PID loop control and a user-friendly touch screen interface. A PID (Proportional, Integral, & Derivative) loop is used as a method for controlling the process. In an exemplary case, the components are an electronic flow meter, a control valve, and a process controller (computer). For example, the flow of sodium chlorite (a chemical used in the production of chlorine dioxide) is automatically controlled utilizing a magnetic flow meter that provides an analog signal output that is proportional to the actual flow (e.g., the actual amount of sodium chlorite supplied). A flow control valve receives the analog signal and adjusts the valve position based upon initial setup. A Programmable Logic Controller (PLC) receives and transmits analog signals from the flow meter (rotameter), to the control valve to control the rate of flow to the value internally computed by the PLC (e.g., amount of sodium chlorite).

Said another way, the PLC contains the interface connections to the devices in the system that are used for control. A flow meter provides an analog signal that is in direct proportion to the flow through it. That signal is input to the PLC and is used by the PLC in internal calculations (in the program) to determine whether the measured flow is correct. The PLC supplies an analog output signal to the control valve which opens and closes in proportion to the analog signal sent to it. This process, known as a PID loop, is commonly used to control flow rates. Additional data is also evaluated in a different fashion. The PLC may monitor the status of a switch (open or closed), and provide a response (alarm, shut down, or other action). The PLC may receive an analog signal from a device and use it to display a tank level condition, or start and stop system components based upon the value of that signal.

Further features incorporated in the new design include all of the normally specified safeties and alarms, but also allow for display of key operating parameters that provide instant information to the operator. Safeties include devices that transmit a signal to the PLC for processing and comparison to an acceptable range or condition. These conditions are continuously monitored and compared to an acceptable condition as set up in the PLC. Included are flow rates, no flow, low flow, empty tank, gas-in-air, set point deviation, efficiency and others. The number of alarms is limited only by the number of devices in the system. The chlorine dioxide generation system of this invention is programmed to provide for chemical flow rates, eductor motive water flow rate, generator set point, process variable, chlorine dioxide concentration, efficiency, tank levels, alarm status, etc., along with trending and alarm histories. In addition, real-time data can be accessed to aid in trouble-shooting as well as reporting issues. An example would be the monthly consumption of chemicals involved in the process. All of the data above, along with help and information screens are able to provide guidance.

An innovative approach to display and self-tuning has been incorporated. Real-time generation efficiency can be displayed utilizing continuous generator effluent analysis, eductor water flow rate, precursor chemical flow rates, as well as the process variable. Tuning occurs when the efficiency falls below defined limits and involves a computed bias to relevant precursor flow rates. The efficient PID loop provides automatic adjustment of chemical feeds to provide the maximum yield of chlorine dioxide. The PLC calculates the maximum possible chlorine dioxide theoretically available from the sodium chlorite flow rate. This value is compared to one calculated from the actual eductor water flow and chlorine dioxide concentration. If the two values differ by more than 5% (this is actually selectable), then a chemical feed adjustment is made (chlorine gas in the case of a two-chemical system, or sodium hypochlorite and hydrochloric acid in the case of a three-chemical system). The process of comparison continues until the variation is acceptable.

In a general example of the process for producing chlorine dioxide, the primary precursor chemical is sodium chlorite solution, normally at a concentration of 25%. At times, other concentrations are used, but would change the chemical reaction. In a two-chemical system, typically, chlorine gas reacts directly with sodium chlorite solution to produce chlorine dioxide. A three-chemical system, typically, uses sodium chlorite (25%), sodium hypochlorite (12.5%), and hydrochloric acid (15%). The net chemical reaction is the same. Sodium hypochlorite and hydrochloric acid react first to produce chlorine gas which then reacts with sodium chlorite to produce chlorine dioxide.

In a typical reaction, the amounts required are:

Sodium Chlorite solution (25%)—0.518 gallons per pound of chlorine dioxide.

Chlorine gas—0.526 pounds per pound of chlorine dioxide.

Sodium Hypochlorite (12.5%)—0.420 gallons per pound of chlorine dioxide.

Hydrochloric Acid (15%)—0.393 gallons per pound of chlorine dioxide.

The measure of efficiency for the process relates the actual amount of chlorine dioxide produced compared to the theoretical amount, based upon the quantity of sodium chlorite used.

Specific examples for carrying out the invention:

In carrying out a specific process employing both sodium chlorite, chlorine gas (two reagent process) and water, the concentration of starting sodium chlorite supply is 25% by weight; the concentration of chlorine gas supply is 100% and the amount of water varies dependent upon unit capacity to produce a concentration of chlorine dioxide of less than 3,000 mg/liter. If the amount of chlorine dioxide produced is excessive, adjustment is to be made to the sodium chlorite; and if the desired amount of chlorine dioxide is inadequate, adjustment is to be made to sodium chlorite and chlorine gas.

In carrying out the process, the reactants are fed into a reaction column and react to produce concentrated chlorine dioxide solution where the concentrated chlorine dioxide solution enters the eductor where it is diluted and transported away as a solution.

In a three-chemical process for producing chlorine dioxide; sodium chlorite solution 25% by weight; sodium hypochlorite 12.5% by weight and hydrochloric acid 15% by weight are fed into the eductor where a vacuum is produced to pull the precursor chemicals into a reaction column where they react to produce concentrated chlorine dioxide generator, the system is monitored for optimum chlorine dioxide concentration. If the chlorine dioxide concentration is too high, sodium chlorite feed is reduced; and if the concentration is too low, sodium hypochlorite and hydrochloric acid feeds are increased.

Equipment packaging has been simplified dramatically, allowing for unrestricted access to key components. Ergonomic designs were incorporated allowing for maintenance and repairs to be made on critical components (flow meters, control valves) without special tools or having to lie down or stand on a ladder. Often, equipment designs do not take into consideration the effort required for access and adjustment.

The chlorine dioxide generation system does not use gravity feed. Gravity feed (without elevated tanks) will not reliably provide enough motive force for adequate flow. In addition, modern feed practices for chlorine gas require the use of an eductor. This is a safety issue that has been adequately addressed with vacuum regulators and other components that "fail safe" when a line break or other interruption occurs. All liquid feeds for the chlorine dioxide generation system use vacuum eductors. This is particularly advantageous in that with a break in the liquid-feed, the vacuum is broken and the system is signaled to shut-down. A vacuum eductor is used for the chlorine gas supply, and is used in the system for the other chemicals as well. Further, there are inherent safety features associated with eductor feed systems that include automatic shut down of chemical flows when the vacuum is lost, air in-leakage when a line develops a leak, etc.

Relative to the "process controller".

The data fed to the process controller includes among other information, (1) all of the real time information from the precursor chemical electronic flow meters, (2) the eductor water flow meter, (3) the optical analyzer, and (4) other devices that indicate a status via a contact or relay. In addition, (5) input signals from customer devices such as flow meters or dosage settings, along with status indicating devices. The process controller uses all analog signals to determine and control the chemical flows required, and sends output signals to the appropriate control valves to assure proper flow rates. The status signals received are compared to what the process controller expects during normal operation, and are continuously monitored. For example, if a sensor that detects the concentration of chlorine dioxide in air set to close a contact when the concentration exceeds a preset level is connected to the process controller, then that device is continuously monitored by the controller. If the contacts close, indicating a level of chlorine dioxide in air higher than the preset level, the process controller will indicate an alarm condition that will be followed by automatic unit shut down and alarm notification such as a horn, light, or other device.

The chlorine dioxide generation system of this invention may be defined as one comprising means programmed for efficiently manufacturing chlorine dioxide wherein the values of precursor chemicals for manufacturing the chlorine dioxide are supplied to a programmable logic controller and with the programmable logic controller continually making adjustment of the precursor chemicals based on the desired amount of chlorine dioxide to be produced to insure that a substantially optimum amount of chlorine dioxide is produced. In the system all liquids are delivered by vacuum eductors which may be seal-less vacuum eductors. The chlorine dioxide generation system incorporates a touch screen that allows the operator to look at data, make changes and monitor operating conditions. The touch screen provides a "Human-Machine-Interface" for ease in monitoring operation and making changes.

The chlorine dioxide generation system which has incorporated therein a proportional, integral and derivative loop. The chlorine dioxide generation system also has a shut-down signal for no flow, low flow, empty tank, gas-in-air and/or set point deviation and may be programmed to compare the current month's consumption of chemicals with past months' consumption of chemicals.

In the system, the chlorine dioxide level is determined by an optical analyzer.

The chlorine dioxide generation system has precursor chemicals supplied through flow meters, valves and other fittings that are substantially free of o-rings.

Further in the chlorine dioxide generation system, there is an improvement comprising supplying the precursor chemical in a system wherein the reaction column, check valve/metering valve assembly, chemical rotameters, tubing connectors and water bleed inlet valve are joined free of o-rings and using devices designed to seal without the use of o-ring seals.

These and other objects of the present invention will become apparent from a reading of the following specification taken in conjunction with the enclosed drawings.

DESCRIPTION OF THE FIGS.

Figure 6:
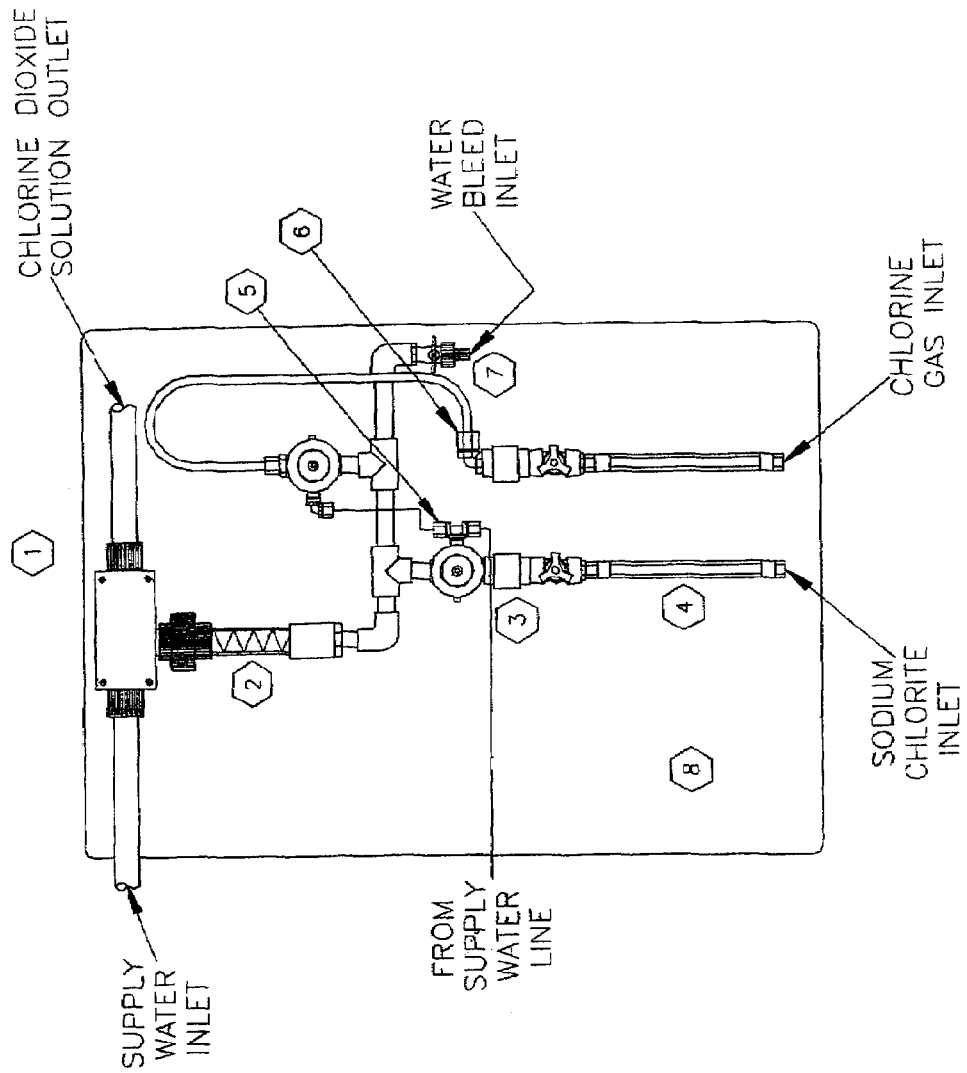

FIG. 6 identifies components of the new design two chemical chlorine dioxide generator.

Figure 7:
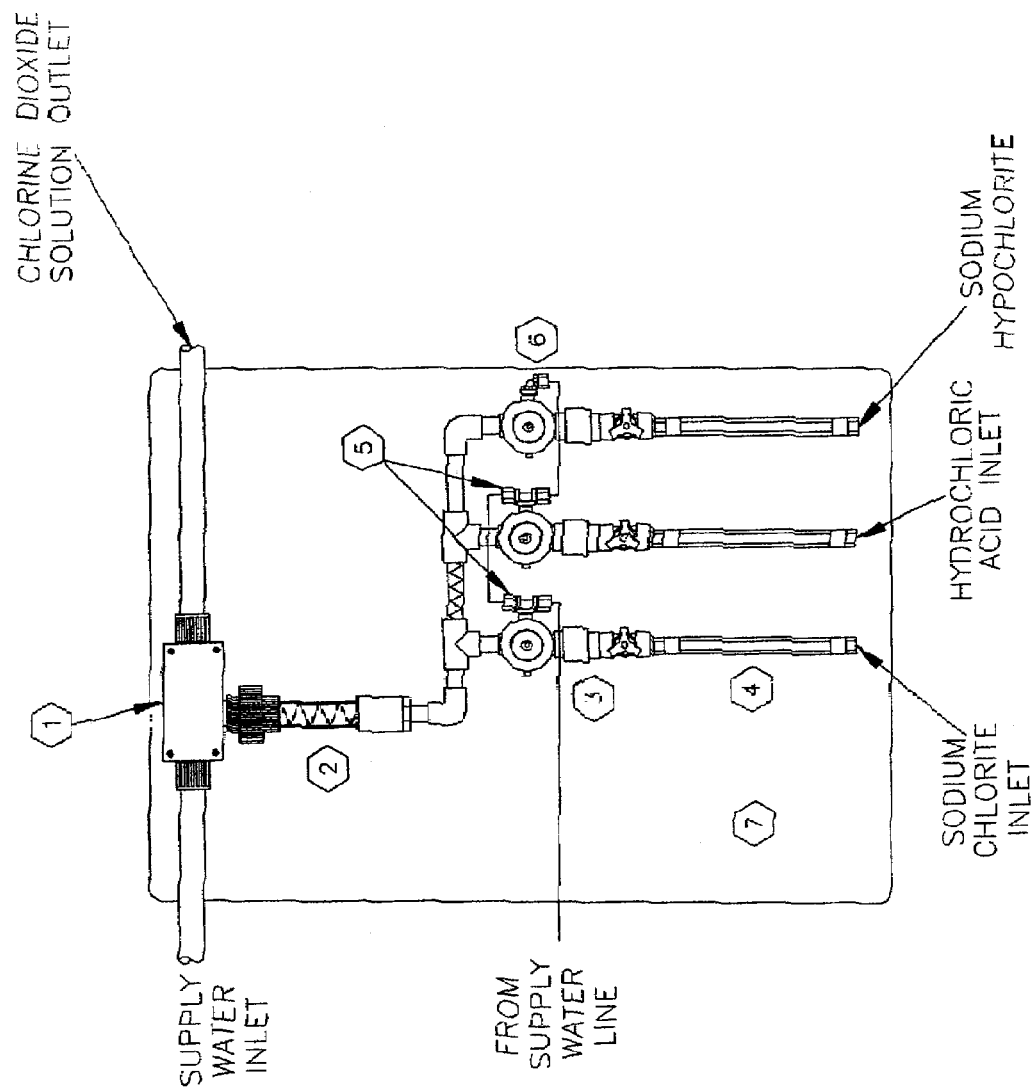

FIG. 7 identifies components of the new design three chemical chlorine dioxide generator.

Figure 8:
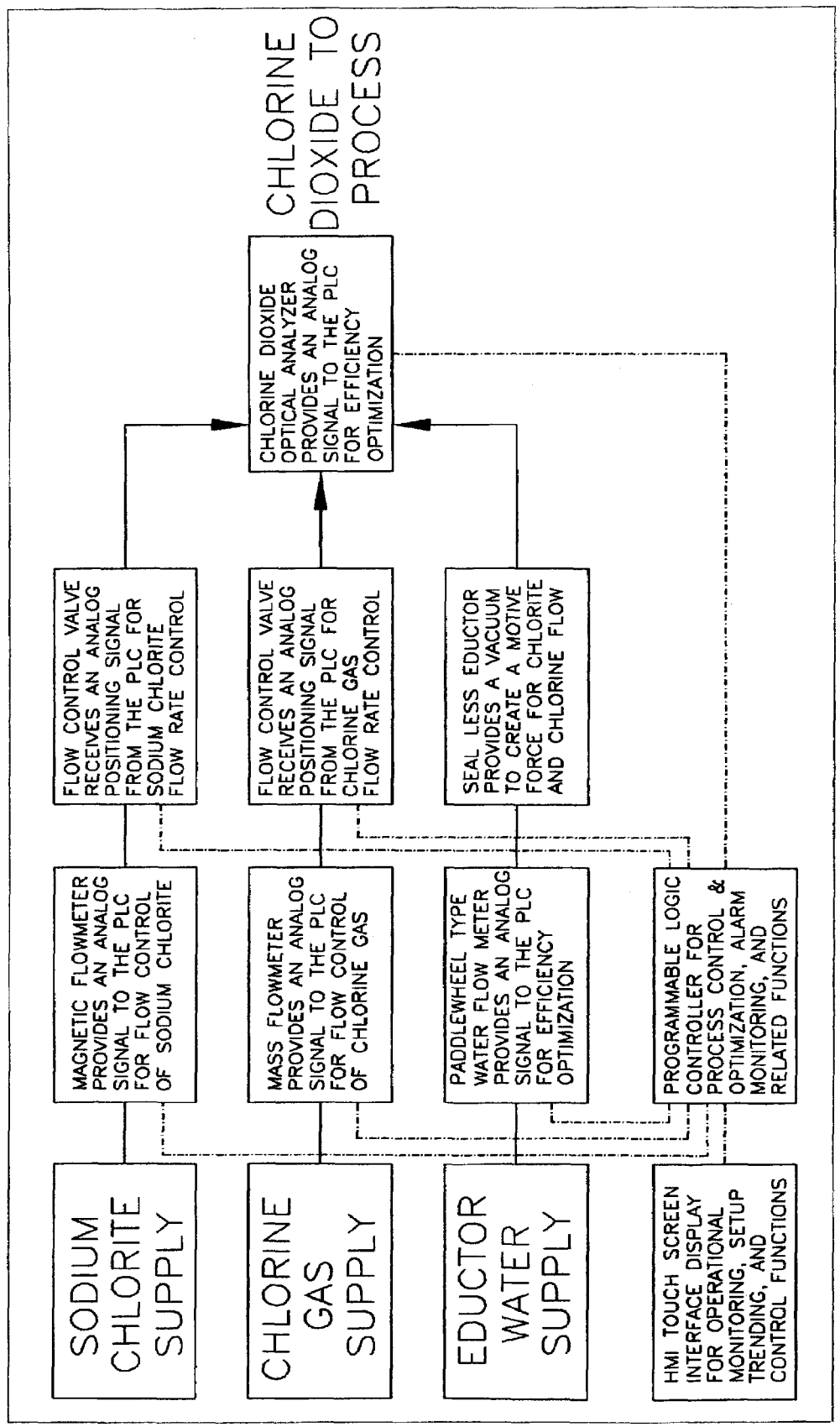

FIG. 8 is a flow diagram of chlorine dioxide production in accordance with the program of the invention.

Figure 9:
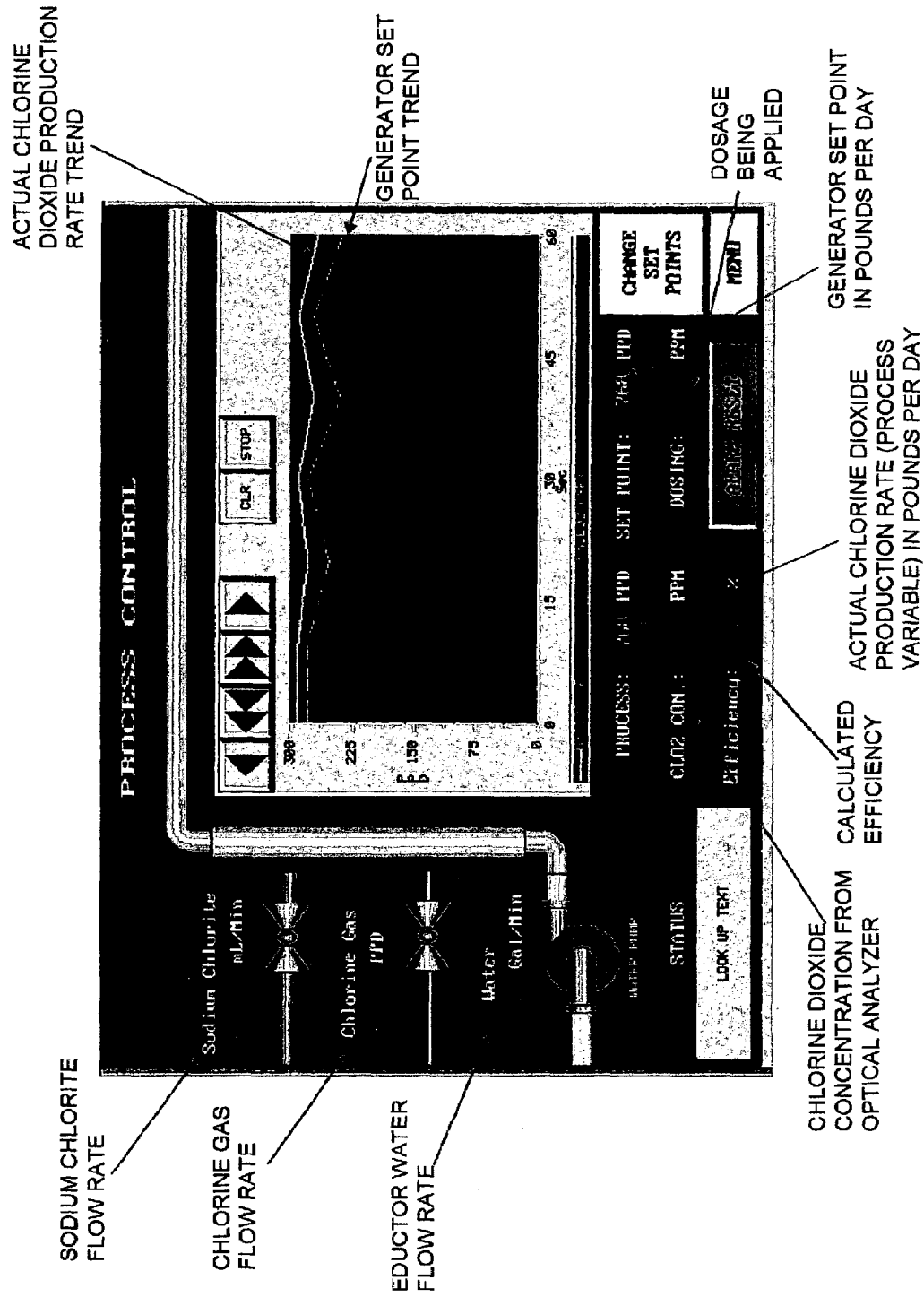

FIG. 9 is an illustration of the touch screen.

Figure 10:
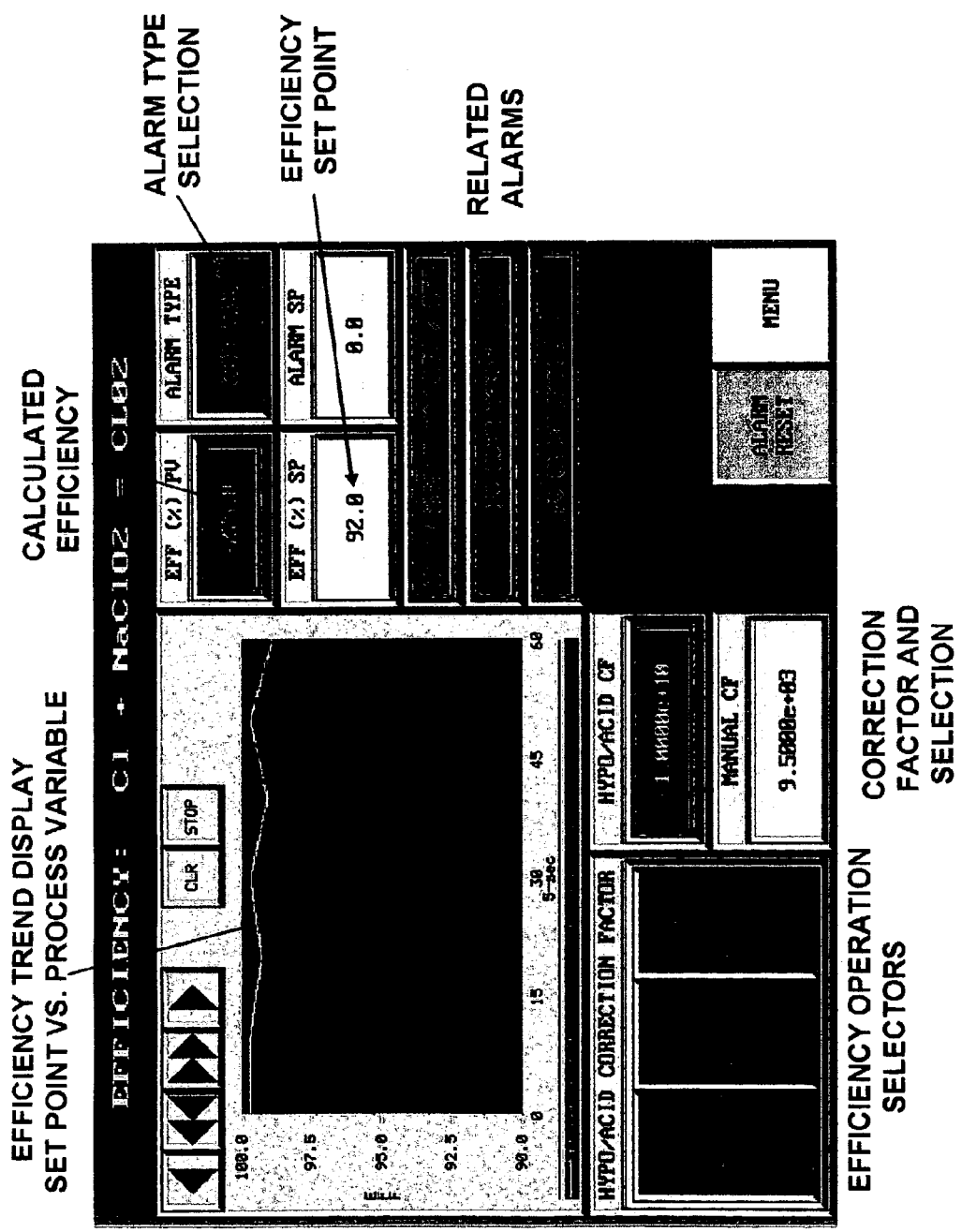

FIG. 10 is an illustration of the automatic efficiency control screen.

DESCRIPTION OF THE INVENTION

A Comparison of Chlorine Dioxide Generators

Figure 1:
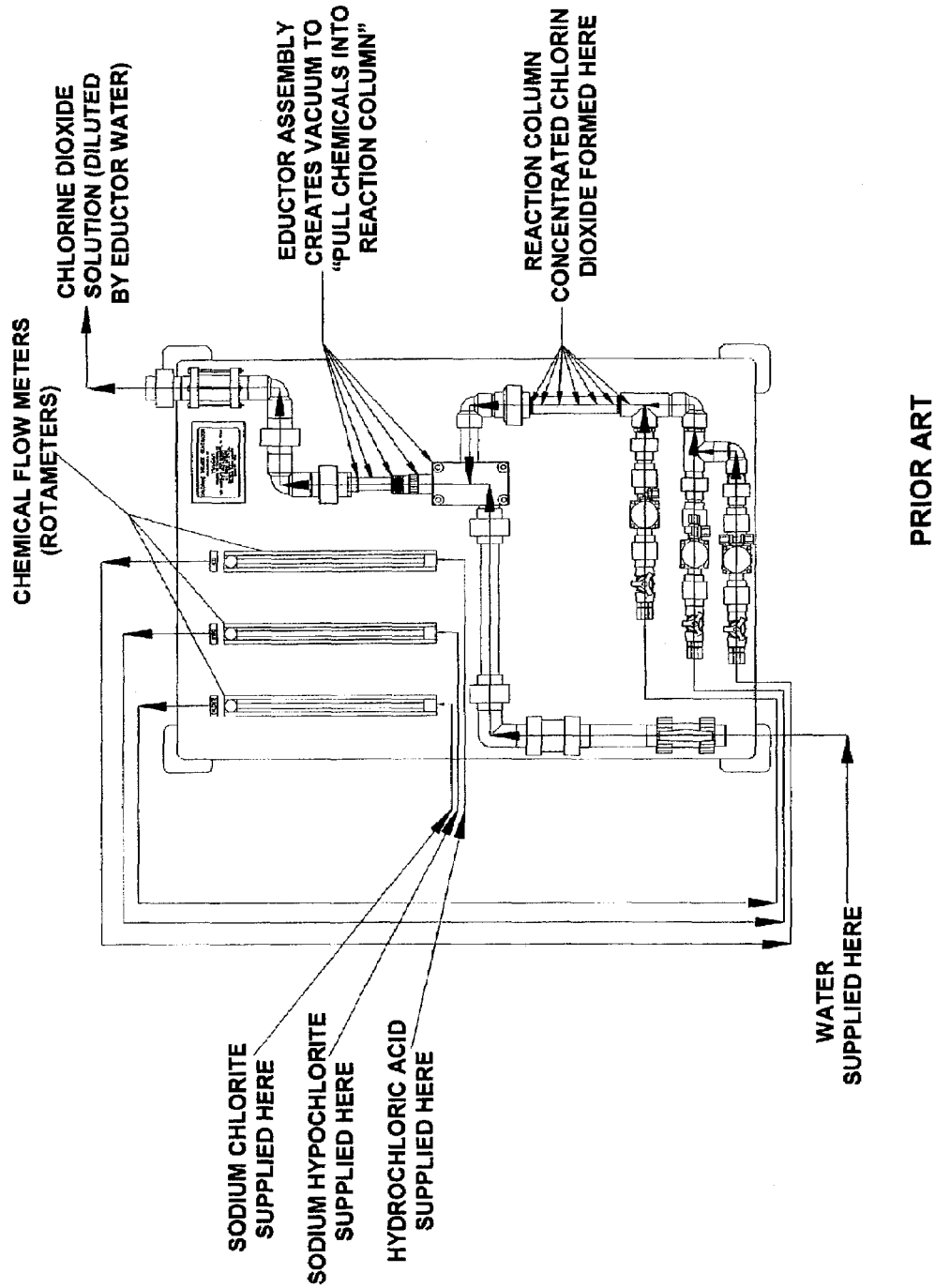
FIG. 1 is a schematic of the old design of the three chemical chlorine dioxide generator.

FIG. 1 shows Vulcan Performance Chemicals' old or prior art design for a manual three chemical Chlorine Dioxide "Generator." The basic concept involves the use of an eductor to create a vacuum to pull the precursor chemicals (e.g., sodium chlorite, sodium hypochlorite and hydrochloric acid) into a reaction column where they react to produce concentrated chlorine dioxide. This chlorine dioxide then enters the eductor where it is diluted and transported away as a solution.

Figure 2:
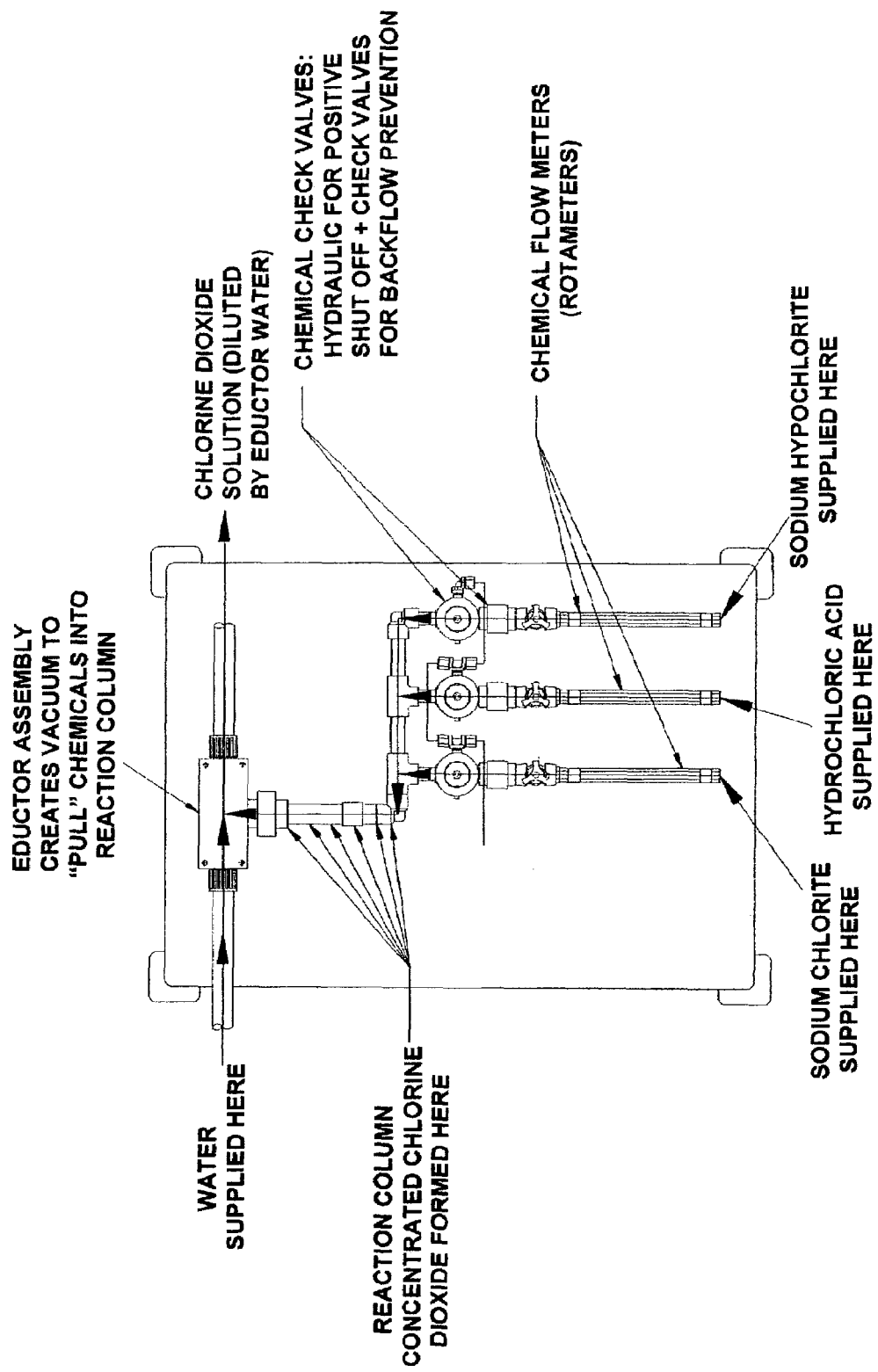
FIG. 2 is a schematic representation of the new design three chemical chlorine dioxide generator.

FIG. 2 shows Vulcan Performance Chemicals' new design for a manual three chemical Chlorine Dioxide Generator. The basic operating principles are the same. The improvements involve significant simplification of the flow circuits along with a dramatic reduction in seals and maintenance. These improvements are shown in greater detail in FIG. 5.

Figure 3:
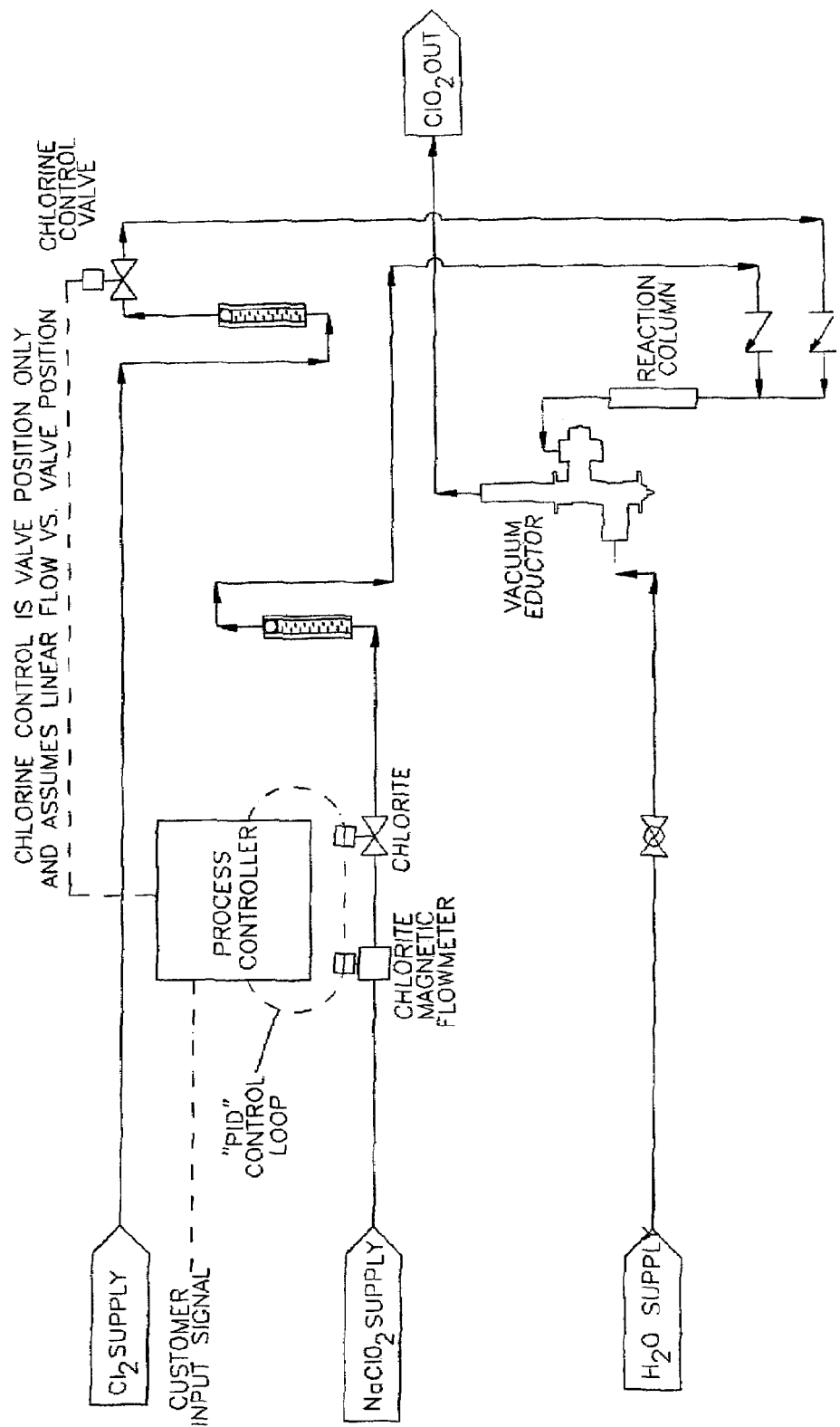
FIG. 3 is a schematic diagram of the old method for producing chlorine dioxide.

FIG. 3 shows a simple process flow diagram of Vulcan Performance Chemicals' old (prior art) "Automatic" Chlorine Dioxide Generator. "Automatic" means that the unit's production rate can be controlled at a local or remote set point (in pounds per day of chlorine dioxide) automatically. The efficiency of the unit is dependent upon the linearity of the flow of chlorine gas through the chlorine control valve and the valve position. There is no feed-back adjustment of controls.

Figure 4:
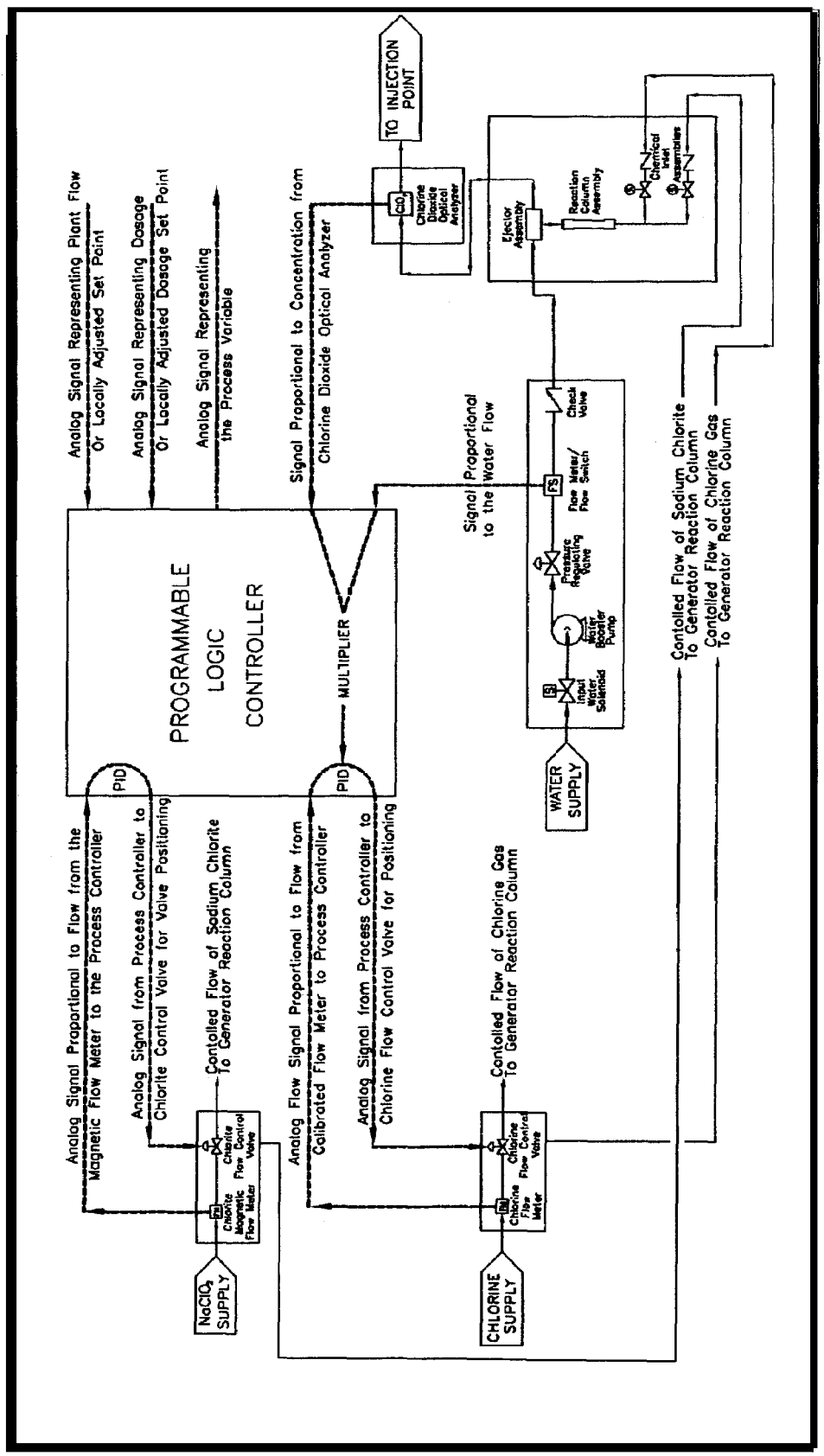
FIG. 4 is a flow diagram of the new method for producing chlorine dioxide.

FIG. 4 is a simple process flow diagram for Vulcan Performance Chemicals' new design for an "Automatic" Chlorine Dioxide Generator. The new design generator additional automatic efficiency enhancements supported by an electronic chlorine flowmeter and an optical chlorine dioxide analyzer. The chlorine flowmeter (rotameter) allows for independent and accurate application of the proper amount of chlorine for maximum efficiency. The optical chlorine dioxide analyzer is looped in with the supply water flow meter and the process controller to allow for fine exact adjustment of precursor chemicals and real-time display of efficiency.

In the diagram of FIG. 4, Analog Signal Representing Plant Flow or Locally Adjusted Set Point and Analog Signal Representing Dosage or Locally Adjusted Dosage Set Point are values used by the process controller to calculate the flow rate required for each of the precursor chemicals. Analog Signal Proportional to Concentration from the Calibrated Chlorine Dioxide Optical Analyzer and Analog Signal Proportional to the Water Flow are values used by the process controller to calculate the process variable using independent process parameters.

With further reference to FIG. 4, the electronic chlorine flowmeter enhances efficiency. For example, the process utilized involves the flow of chlorine gas through a device that provides an output signal that is in direct proportion to the actual gas flow. The efficiency enhancement is due to the improvement in accuracy. The process controller uses PID loop control to accurately supply the proper amount of chlorine. Historically, the chlorine flow rate was accomplished with a control valve only. The flow of chlorine was assumed to be linear with valve position, which it is not; therefore, improved efficiency at all production rates.

In operation, the mass dispersion chlorine flowmeter sends a signal to the process controller which in turn adjusts the control valve (to open or close). In this way, the production of chlorine dioxide can be efficiently produced.

Further referring to FIG. 4, the optical chlorine dioxide analyzer analyzes for the yellow-green color of the chlorine dioxide in the aqueous solution, and provides an independent value to the process controller that is used to compute the chlorine dioxide production rate. This value is compared to the chlorine dioxide production rate as calculated from the sodium chlorite flow rate. The resulting comparison provides verification of efficiency, or uses a PID loop involving the optical analyzer, the chlorine control valve and the process controller to increase the efficiency to the desired level. This automated efficiency feature guarantees the quality of the chlorine dioxide produced. In the event optimum chlorine dioxide is not being produced, the process controller will make the following adjustments: (1) open the chlorine valve incrementally, (2) observe any change in efficiency, (3) repeat until acceptable, and (4) if an increase in chlorine gas flow does not improve the efficiency, the controller will close the chlorine valve incrementally until the efficiency improves to the desired level.

Figure 5:
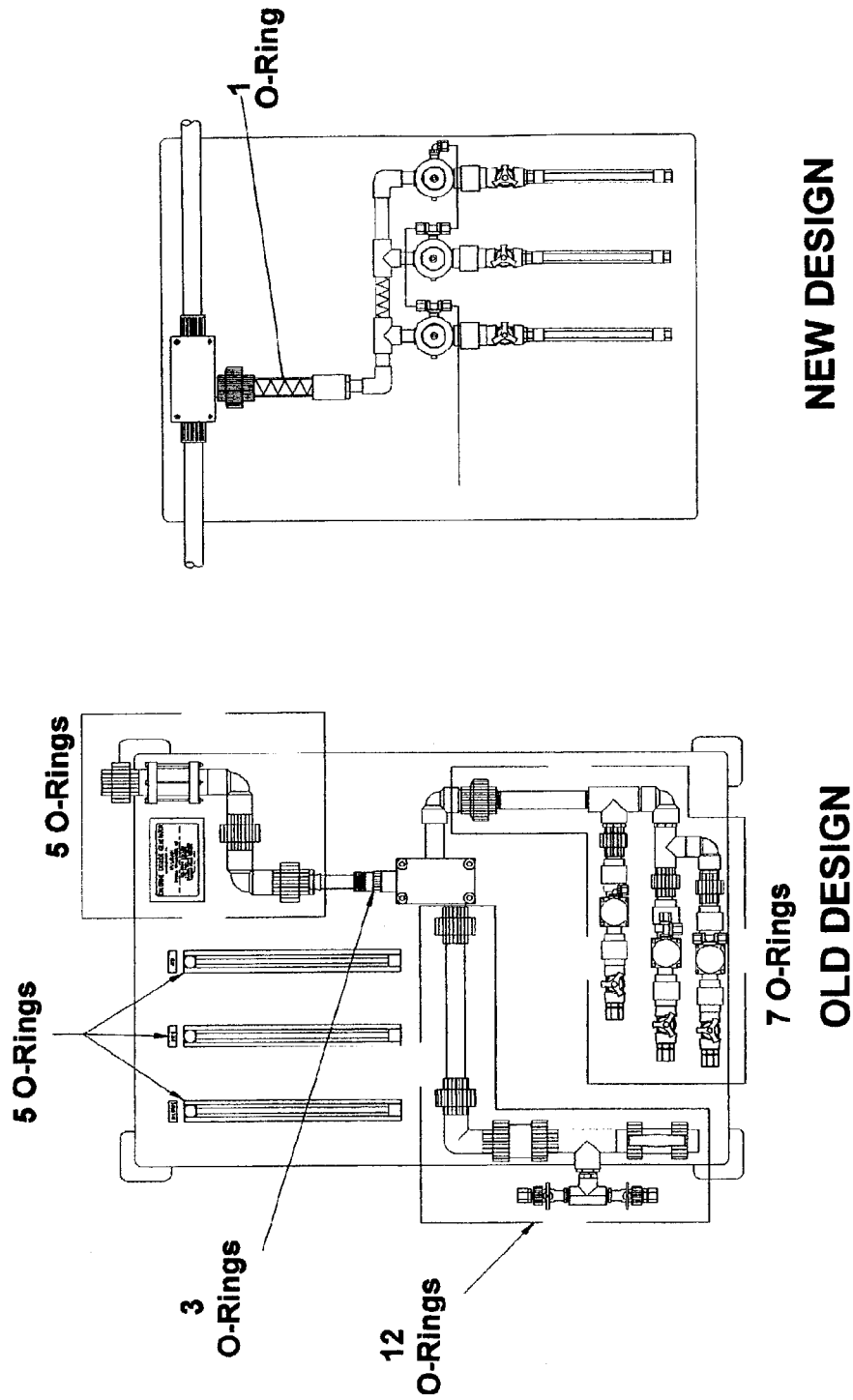
FIG. 5 is a comparison of o-ring placement in the old and new design of the chlorine dioxide generator.

FIG. 5, "Old Design" vs. "New Design", there are fewer parts and different placement of components. Wet end improvements are shown the significant "wet end" improvements involve dramatic simplification along with a very significant reduction in the number of parts that require periodic service. The chlorine dioxide generation system provides for a dramatic reduction in the number and type of seals that require (excessive) maintenance. Common practice has been to use Viton™ seals in all areas of the equipment. Viton is known to have a limited service life with some chemicals encountered in the generation process. In the new design-emphasis has been placed on the elimination of seals where possible. A most significant innovation has been the development of a seal-less eductor. Where seals exist, a more resistant material has been selected. New designs were incorporated: (1) in the ejector—reducing the seals from 3 to 0, (2) seal-less tubing connectors, (3) seal-less manual flow meters (rotameters), and (4) simplified design reduced the number of union-type fittings. Actual experience in the past year have borne this out. Maintenance issues have been minimized. In addition, the overall cost of the wet end components is significantly lower. Mechanical flow meters (rotameters) of the new design have no seal maintenance issues whereas the old flow meters have 5 O-Ring seals that require replacement at least each 6 months. Simplified design has reduced the number of unions (each with 1 O-Ring) to 1 from 6. A clear section of schedule 80 PVC has replace a sight tube and its 2 O-Rings. Automatic unit control valves and flow meters are positioned on a stainless steel rack at approximately waist height. This makes working with those components less difficult. The old designs required kneeling, or even lying down to reach low components, that were often enclosed in dark places. In FIG. 5 exemplary of the board-size on which the components are placed is 27 inches wide and 37 inches high. These measurements could be varied as understood by those skilled in the art.

FIGS. 6 and 7 compare the components of the new design two-chemical chlorine dioxide generator and the three-chemical chlorine dioxide generator, respectively.

The numbers in FIG. 6 describe
1. Ejector
2. Reaction column/chemical inlet assembly
3. Check valve/metering valve assembly (2)
4. Chemical rotameters (3)
5. ⅛" MPT×⅛" hose tee tubing connector
6. ⅛" MPT×⅛" hose elbow tubing connector
7. Water bleed inlet valve
8. Fiberglass backboard.

and the numbers in FIG. 7 describe
1. Ejector
2. Reaction column/chemical inlet assembly
3. Check valve/metering valve assembly (3)
4. Chemical rotameters (3)
5. ⅛" MPT×⅛" hose tee tubing connector (2)
6. ⅛" MPT×⅛" hose elbow tubing connector
7. Fiberglass panel with feet.

FIG. 8 is a flow-diagram of chlorine dioxide production using sodium chlorite, chlorine gas and eductor water supply. The programmable logic controller controls the amount of chemicals fed into the system by analyzing the amount of chlorine dioxide produced. The amounts of chemical fed into the system is controlled by a flowmeter which in turn is controlled by the programmable logic controller. A seal-less eductor provides vacuum. A touch screen is incorporated into the system to monitor and adjust for real-time conditions.

FIG. 9 is an illustration of the touch screen employed in this invention. The touch screen is a full 10.4 inches in size. This display provides an overall "look" at what is happening in the chlorine dioxide generation process. The operator can see the sodium chlorite flow rate, chlorine flow rate, and other relevant parameters such as chlorine dioxide concentration all on one screen. In addition, the operator can observe the trends for set point and process variable on the same display. This is important to quickly observe system stability, both in the set point (from a remote signal) and the corresponding process variable (how much chlorine dioxide actually being produced.

Further, the touch screen interface display used in this invention provides immediate access to information and control by "touching" the appropriate location displayed on the screen itself, much as self-service gasoline is often dispensed. The operator "makes a selection" which allows for a specific response or entry to be made. This could involve changing the generator set point, changing the input from local to remote control, setting up initial meter span parameters, and virtually any other operating function required. For example, if the operator sees a "no chlorite" alarm, he can investigate the cause and solve the problem; or another example, if the operator needs to change the dosage, he can go to the dosage screen and make the adjustment by entering the desired dosage.

In further explanation of the operation of the touch screen of FIG. 9:

An actual Chlorine Dioxide Production Rate Trend is used to evaluate system stability and observe changes.

The Generator Set Point Trend is used to observe input signal changes.

Dosage being applied is the actual pounds of chlorine dioxide per million pounds of water that it is being applied.

Generator Set Point in pounds per day is the set point for the amount of chlorine dioxide that the generator is scheduled to produce.

Actual Chlorine Dioxide Production Rate (Process Variable) in pounds per day is the actual amount of chlorine dioxide produced relative to the theoretical.

Calculated Efficiency is measured by stoichiometric amount, e.g., conversion sodium chlorite to chlorine dioxide.

Examples of set points which could be changed are dosage, $ClO_2$ set points.

An example of the use of the alarm reset is when a chemical day tank goes empty and is then refilled. The alarm would have to be reset.

FIG. 10 is an illustration of the automatic efficiency control screen employed in this invention. This display provides setup and monitoring for automatic efficiency control. The operator can set the range of efficiency control desired (usually above 95%) and provide for an alarm feature if the actual efficiency deviates from entered ranges. The operator can also turn the automatic efficiency feature "on", "off" or to "manual". The manual feature allows for the operator to intentionally add excess chlorine if a specific need requires it. As with the process control screen, the efficiency set point and process variable are displayed on a trend display for a quick observation of system stability.

In further explanation of the operation of the automatic efficiency control screen of FIG. 10, the Efficiency Trend Display has the following features:

Set Point vs. Process Variable is employed to observe system stability and changes.

Calculated Efficiency is used to automatically tune the generator.

Alarm Type Selection is used to determine if efficiency control is important or not. If not critical, the alarm will occur but the unit will continue to operate.

Related alarms are optical analyzer failure—(lamp failure).

Correction Factor and Selection is used for control of efficiency feature. Some applications may want to manually apply excess chlorine.

OP TEK System Failure/Off Alarm is an alarm indicating the optical analyzer is malfunctioning.

PV over-range and PV under-range are signals to gauge efficiency. If the efficiency set point is 95%, over-range would be >100%; under-range <90% if the alarm is set for ±5%.

The primary use for automatic efficiency operation is to set up the control. For example, when "Auto" is selected, self-tuning occurs. When "(off) reset to 1.0" is selected, the auto efficiency feature is disabled. When "Manual" is selected, the operator can bias the chlorine feed by the amount entered as "Manual Cf."; >1.0=more chlorine; <1.0=less chlorine.

The herein disclosed invention has been presented without providing for the electronic circuitry since this circuitry would be readily understood by those skilled in the art.

Obviously, many modifications may be made without departing from the basic spirit of the present invention. Accordingly, it will be appreciated by those skilled in the art that the invention may be practiced other than has been specifically described herein.

What is claimed is:

1. A chlorine dioxide generation system, comprising:
    a reaction column;
    a source of sodium chlorite reactant fluidly connected to the reaction column;
    a first sensor configured to detect a flow rate of at least one reactant delivered to the reaction column;
    a second sensor configured to detect a chlorine dioxide concentration of a product stream generated by the system;
    a controller, in communication with the first and second sensors, configured to:
        determine a theoretical chlorine dioxide production rate based on the flow rate of the at least one reactant detected by the first sensor;
        determine an actual chlorine dioxide production rate based on the chlorine dioxide concentration detected by the second sensor;
        monitor a system efficiency based on the theoretical chlorine dioxide production rate and the actual chlorine dioxide production rate; and
        adjust flow of at least one reactant to the reaction column based on the system efficiency.

2. The system of claim 1, further comprising a source of chlorine reactant fluidly connected to the reaction column.

3. The system of claim 1, further comprising a source of sodium hypochlorite reactant, and a source of hydrochloric acid reactant fluidly connected to the reaction column.

4. The system of claim 1, wherein the second sensor comprises an optical chlorine dioxide analyzer.

5. The system of claim 1, wherein the controller uses a Proportional, Integral and Derivative loop to adjust flow of at least one reactant to the reaction column to produce a desired amount of chlorine dioxide.

6. The system of claim 1, wherein the first sensor comprises a flow meter configured to provide an output signal to the controller in direct proportion to actual flow of at least one reactant through the flow meter.

7. The system of claim 6, further comprising a valve in communication with the controller, configured to regulate flow of at least one reactant to the reaction column, wherein the controller provides a control signal to the valve to adjust flow of at least one reactant to the reaction column based on the output signal of the flow meter.

8. The system of claim 7, wherein the system efficiency is not dependent on linearity of a reactant flow rate with respect to positioning of the valve.

9. The system of claim 1, wherein a flow of at least one reactant is adjusted in response to the system efficiency being deficient with respect to a predetermined limit.

10. The system of claim 3, wherein flow of at least one of sodium hypochlorite and hydrochloric acid is adjusted in response to the system efficiency being deficient with respect to a predetermined limit.

11. The system of claim 1, wherein the controller continuously adjusts a flow rate of at least one reactant to the reaction column.

12. The system of claim 1, further comprising a vacuum eductor adapted to facilitate delivery of at least one reactant to the reaction chamber.

13. The system of claim 12, wherein the vacuum eductor comprises a seal-less vacuum eductor.

14. The system of claim 1, wherein the first sensor comprises an electronic mass dispersion flow meter.

15. The system of claim 1, further comprising a human machine interface in communication with the controller.

16. The system of claim 15, wherein the human machine interface comprises a touch screen.

17. The system of claim 1, wherein the controller is further configured to compare current reactant consumption to historical reactant consumption.

18. The system of claim 1, further comprising an efficiency control monitor.

19. The system of claim 18, wherein the efficiency control monitor is provided with an efficiency set point display or a process variable display.

20. The system of claim 1, wherein the system is substantially free of o-rings.

21. The system of claim 1, wherein the controller is further configured to monitor a system condition and to provide an alarm if the system condition deviates from an acceptable system condition.

22. The system of claim 2, wherein flow of at least one of sodium chlorite and chlorine is adjusted in response to the system efficiency being deficient with respect to a predetermined limit.

23. A method of facilitating chlorine dioxide generation, comprising:
providing a controller configured to:
determine a theoretical chlorine dioxide production rate based on a flow rate of sodium chlorite supplied to a reaction column;
determine an actual chlorine dioxide production rate based on a chlorine dioxide concentration detected in a product stream;
monitor a system efficiency based on the theoretical chlorine dioxide production rate and the actual chlorine dioxide production rate; and
adjust a flow rate of at least one reactant to the reaction column based on the system efficiency.

24. The method of claim 23, further comprising providing a sensor configured to detect the flow rate of sodium chlorite supplied to the reaction column.

25. The method of claim 23, further comprising providing an optical chlorine dioxide analyzer to detect the chlorine dioxide concentration in the product stream.

* * * * *